Nov. 15, 1938.  E. REANEY  2,136,954
FINISHING CUTTER
Filed Jan. 25, 1938
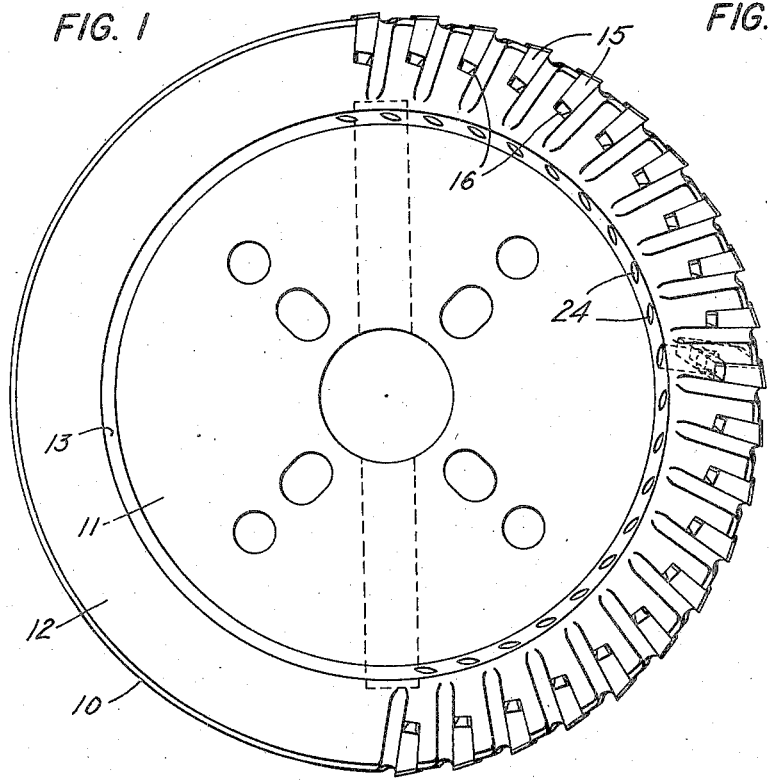
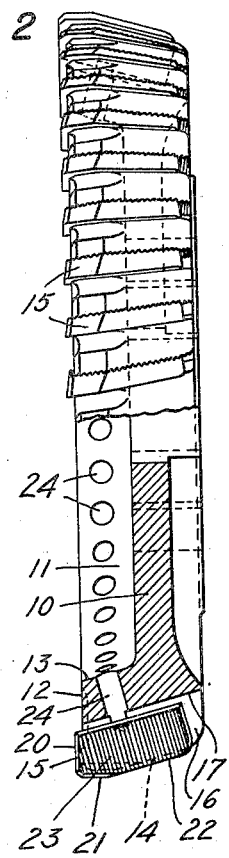
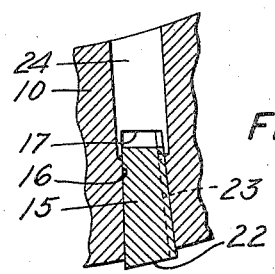
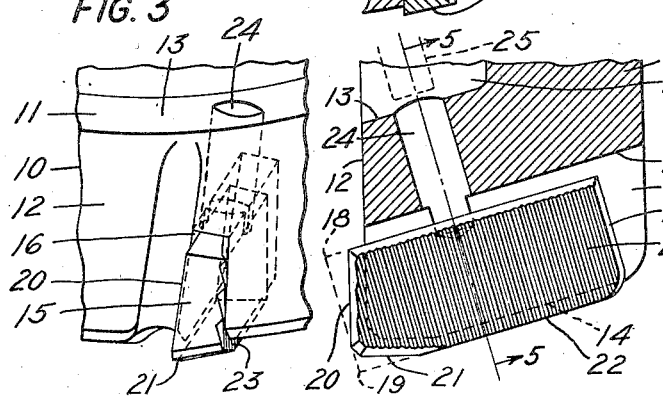
INVENTOR
Ernest Reaney
BY
Albert F. Nathan
ATTORNEY Patented Nov. 15, 1938

2,136,954

UNITED STATES PATENT OFFICE 2,136,954

FINISHING CUTTER

Ernest Reaney, Stratford, Conn., assignor to The O. K. Tool Company, Inc., New York, N. Y., a corporation of New York Application January 25, 1938, Serial No. 186,803

2 Claims. (Cl. 29—105)

The present invention relates to inserted blade cutters and more particularly to multiple bladed finishing cutters of large diameter.

A primary aim of the invention is to render available a face milling cutter having the capacity for finish milling surfaces of relatively extensive width, say to fourteen inches, in one mass of the cutter.

A further object of the invention is to provide a strong sturdy body member for an inserted blade cutter having a large machining area capacity and in which there may be seated a multiplicity of individually adjustable blade elements, each of which is firmly locked in position in the body by a wedging action.

A further aim of the invention is to avoid the necessity heretofore experienced of removing the cutter from its mounting on a machine spindle each time it became necessary to readjust the blades to compensate for wear thereon. In addition to the time involved in removing and replacing the cutter on the machine spindle, the removal of the cutter always destroyed its original accuracy and concentricity and frequently meant considerable truing and regrinding in position to restore its accuracy. The present invention aims to eliminate this source of needless waste of blade material by a structure in which the respective blades are held firmly in position by a wedging action and in which each blade may subsequently be removed for adjustment or replacement purposes by conveniently accessible means operable from the front or face of the milling cutter and without removing or disturbing the original mounting of the cutter on the machine tool spindle.

A further aim of the invention is to render available a finishing cutter structure that gives a firm and solid backing to substantially the entire surface of the blade and at the same time a cutter that is economical on blade material whereby maximum amount of use or service may be obtained out of the respective blades. In the attainment of those ends, it is proposed to construct the blades from bar stock which has been initially tapered crosswise its length and to construct a body member with blade receiving slots not only tapered complementally to the taper on the blades, but arranged in the body a manner such that when the blades are assembled therein the severest cutting action will occur thereon in the direction of the blade's length, and the less severe cutting action will occur thereon in the direction of the blade's width. In other words, the cutting edge of the blade which performs the heaviest cutting and consequently which requires more frequent grinding, is backed up by a substantial length of blade stock, whereas, the cutting edge which does little cutting and requires little regrinding is backed up by relatively little blade stock.

In furtherance of the general objective to economize on blade material and increase the service and life of the blades, the tapered slots are arranged in the body at an angle to both cutting edges on the blades so that adjustment of the blades along the slots will advance both cutting edges simultaneously. The angular disposition of the blades is such that the rate of advance will be faster in a longitudinal direction (direction of the face), than the rate of advance in a crosswise direction (on the diameter) and also such that the pressures of the tooling forces acting upon the blades, reacts thereon at least in one direction as more firmly to clamp the blades in the body.

In carrying out the aims of the invention, it is proposed to construct the body member in the form of a large and relatively thick disc and to recess the central front face thereof somewhat less than half the thickness to provide a substantially heavy outer rim approximately twice as thick in a radial direction as the blades are in width. The outer periphery of the rim is provided with a multiplicity of blade receiving slots, the bottom walls of which converge rearwardly (like the surface of a cone). Each slot is also tapered in a direction perpendicular to its direction of incline and has a depth of approximately half the thickness of the rim so as to give the requisite strength and support to the body member as a whole.

Blade members, fashioned from transversely tapered bar stock are then driven into the slots, like wedges, and firmly clamped between the side walls. To insure firm clamping by a wedging action, the blade slots are slightly deeper than the blades are in width, and, as the respective front and rear walls of both blade and slots are parallel plane surfaces, mutually inclined toward one another, the blades require no auxiliary guides to align them in the slots. The single crosswise taper promotes self-aligning of the blades and as the slots converge generally rearwardly, the forward and end corners of the blade are caused to project the furthest. Those corners are thereafter ground away to produce radial and longitudinally extending cutting edges, the radial edge being slightly less than the width of the blade, and the outer longitudinal edge, by reason of the angular disposition of the blade relative to the cutter axis, considerably less than the total length of the blade. The outer longitudinal edge of the blade which continues rearwardly of the ground edge, slopes inwardly therefrom and does not interfere with or rub on the finished surfaces. As the blades are advanced forwardly along their inclined slots, new blade material for the cutting edges is progressively presented, the rate of advance of the end of the blade (face of milling cutter) being in a ratio of approximately 4-1, with respect to the rate of advance of the side cutting edge (diameter).

The body member is suitably bored and keyed at its rear to fit the standard spindle. Usually a cutter, when first mounted and bolted on a spindle, has a definite amount of run out, wobble, etc., and to obtain a true running finishing cutter, the final sharpening of the individual blades is done in place on the machine. Where, however, the cutter head must be removed from its mounting before the blades can be removed from the cutter and readjusted, the removal and remounting introduces an additional error or errors which cannot be taken out without the removal of considerable blade material. To avoid such waste and to facilitate the operation of restoring and sharpening the cutter to size, it is proposed to provide means accessible from the front or face of the cutter for conveniently removing the blades. To this end knock-out holes are bored in the rim of the body member under each blade slot at an angle substantially perpendicular to the direction of longitudinal incline of the slots so that the taps of a drive pin will be transmitted to the under side of the blade substantially midway between its ends and directly in line with the direction of taper.

By such a construction there is no biasing or one sided blow upon the blades that would tend to crack them, which is a known and recognized weakness of many of the blade materials and structures used today. Apart from this, however, the outward incline of the knock-out holes away from the plane of the cutter enables the operator to tap out the blade without danger of striking the opposite side of the cutter or the blades therein, all of which, it will be seen, is by this invention accomplished without removing or disturbing the setting of the cutter on the machine spindle.

When the blade has been knocked out, it may immediately be reinserted in an advanced position in the slot and driven into clamping relation therewith, and as all of the other blades are still in slots, the driving-in of the readjusted blade does not flex the body member or place it under any undue stress. By means of a gauge or other appropriate stop, the user may determine the extent of readjustment to be given to each blade. However, such auxiliary devices are dispensed with in the present invention by further providing each blade and blade slot with a series of serrations extending crosswise the blade which serve as a convenient and permanent means for setting the blade over in unit increments. The relative rates of advance of the cutting edges of the blades is conveniently determined by the formula:—

Spacing of the serrations X the cosine of the angle of incline=the advance in an axial direction (end face), and Spacing of the serrations X the sine of the angle of incline=the advance or increase in the radial direction (diameter).

And if the serrations have the spacing of approximately .06 inch, and extend perpendicular to the longitudinal axis of the blade which is, let us say inclined 15° from the axis of the cutter, the advance of the end or face cutting edge of the blade will be approximately .064" as compared with the advance in a radial direction of .017".

This is in the ratio of about 4 to 1, which compares favorably with the relative amounts of work done by the cutting edges and the frequency of their need for resharpening.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which:—

Figure 1 is a face view of a finishing cutter incorporating the invention.

Fig. 2 is a side view thereof partly in section.

Fig. 3 is a peripheral portion of the cutter enlarged to illustrate more clearly features of the blade and its clamping means.

Fig. 4 is a sectional view of the cutter periphery taken substantially in the plane of one of the blades illustrating its angular relation with respect to its end and side cutting edges and the location and relation of the blade releasing means to the blade itself.

Fig. 5 is a transverse sectional view along lines 5—5 of Fig. 4.

Referring more particularly to Figs. 1 and 2, the body of the cutter comprises a relatively large disc member 10, recessed a little less than half way as at 11, to form an external annular rim 12. The inner periphery 13 of the rim 12 flares outwardly at an angle approximately 15° from the axis of rotation, for a purpose later to be explained, and the outer periphery 14 is rearwardly inclined at substantially the same angle. The inclined surfaces 13 and 14 form, in effect, inner and outer walls of a cone shaped rim of substantial thickness within which blade members 15 are seated. The blade seating means comprises a plurality of generally radial slots 16 extending from the outer surface of the rim inwardly to a depth of approximately half the thickness of the rim, which slots have their lower walls 17 rearwardly and inwardly inclined, and parallel to the inclined surfaces 13 and 14. The slots 16 are also tapered crosswise their length, i. e., perpendicular to the incline of their lower walls 17, as shown in Fig. 5. The blade members 15 which are formed from a bar of blade material, likewise formed with a single taper in a crosswise direction, are adapted to be inserted like short wedges into the taper slots 16 and driven firmly into clamped relation between the front and rear walls of the slots. Since the front and rear walls of both blade and blade slots are parallel in a longitudinal direction, the one is the complement of the other and the blade automatically aligns and seats itself on the slot at an angle coincident with the angle of incline previously given to the said tapered slot. This angular positioning of the blade in the body causes the forward, outer and inner corners of the blade to project the furthest in diametral and axial directions respectively. After the cutter is fully assembled, the projecting corners 18 and 19 are ground away to provide radial cutting edges 20 and axial cutting edges 21 on the blade, the latter cutting edge extending only a short distance back from the front or face of the cutter. The remaining portions of the outer longitudinal edge 22 of the blade inclines away from the line of cut of the edge 21 and does not, therefore, rub or interfere with the cutting action.

The manufacture of blades and cutter bodies of this design has been rendered relatively simple and inexpensive by virtue of its simplicity and the straight plane surfaces that require machining. Rotary cutters of the inserted blade type usually have the plane of the blades therein set at a slight angle to a radial plane and also at an angle to the axis of rotation to provide the proper rake angles with respect to the face and peripheral cutting edges of the inserted blades. In the present embodiment, the blades are set in the body at still a third angle, to wit, the angle which inclines the longitudinal axis of the blades inwardly and rearwardly from the face and forward peripheral portions of the body. The cutting of such compoundly inclined tapered slots in a cutter body becomes a simple matter after the body and slotting tool are properly related for cutting the first slot. Thereafter, the succeeding slots are formed merely by indexing the cutter body the required amount.

While the mutually inclined front and rear walls of the blades and slots coact to align the blade and to clamp the blade firmly throughout substantially its entire surface, the clamping is made more secure by forming a series of serrations upon one surface of the blade and its engaging wall of the slot which interfit to lock the blade positively against shifting in a direction transverse the serrations. In the present embodiment the blade and blade slots are serrated in a direction of their width which also is in the same direction as the taper. By extending the serrations in the direction of the taper on both blade and blade slot, complications incident to the formation of the serrations is greatly simplified by reason of the fact there is only one angle to contend with.

A further and important function of the serrations has to do with the setting and readjusting of the blades in their tapered slots. In the case of a plain blade and slot, inclined and tapered as herein explained, the blade may be advanced in a general direction of its length forwardly and outwardly thereby to present new blade material for the cutting edges and thereafter driven into clamped position. However, in the absence of a suitable blade locating fixture the reinsertion of the blades will never be uniform and considerable grinding is required to true the assembled cutter. By providing adjacent faces of the blade and blade slot with serrations and extending those serrations crosswise the blade, a simple and permanent means is provided for accurately indicating the amount of adjustment given to each successive blade. After the assembled cutter has once been trued, a readjustment of each blade one serration will cause the cutting edges thereof to advance precisely the same amount, the variation if any, being that which is incident to the factor of compressibility of the blade or body members, which is indeed very slight.

The removal of the blades for purposes of readjustment or replacement has heretofore occasioned considerable difficulty due primarily to the inability to release the blades without cracking or splitting. This difficulty has been overcome in the present invention by boring a hole 24 in the rim 12, under each blade, which intersects the blade slots 16 approximately midway the ends of the blade. The axis of the hole 24 is inclined away from the general plane of the cutter and extends in a direction parallel to the serrations 23, and is accessible from the inside and front face of the cutter. The flared wall 13 of the rim is substantially at right angles to the axis of the hole 24 to afford a flat starting surface for the drill. To dislodge the blade from its slot, the operator will insert a drift pin 25, shown in dotted lines in Fig. 4, into the hole 24 and tap it gently to release the blade. It will be seen that the drift pin engages the blade centrally and imparts a force acting directly in line with the direction of the taper on the blade and there is thus no danger of cracking the blade.

A further important feature of the invention relates to the location of the blade releasing means and accessibility thereof from the front face of the assembled cutter. In certain prior constructions of inserted blade cutters, the blades thereof could be removed only by approaching them from the rear face of the cutter. In such instances it became necessary to remove the cutter from its mounting on the spindle, reset the blades and then remount it. This remounting of the cutter on the machine spindle invariably introduced errors in alignment and concentricity of the cutter and meant additional grinding away of blade material to bring it true. This needless waste of blade material is avoided by the present invention by the provision of the blade releasing means operable from the front face of the cutter designed to impart a force centrally upon the blades in a releasing direction.

Other factors such as tooling pressures have also been given consideration in correlating the tapers, serrations and angles of incline of the blades so that the tooling forces reacting upon the blades, at least along one of the cutting edges (21) acts in the direction effecting a firmer clamping of the blades in their slots.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In an inserted blade finishing cutter means for releasing the blades for readjustment or replacement without removing the cutter assembly from the spindle of a machine tool, combining a cutter body member having an outwardly flared cone shaped rim portion and a plurality of blade receiving slots formed in the periphery thereof, said slots extending across the rim with their bottom walls paralleling the outer cone shaped surface of the rim and being tapered in a direction substantially crosswise their length; complementally crosswise tapered blade members inserted in said slots and adapted to be clamped therein by a wedging action; a series of parallel serrations on one surface of each blade and the engaging surface of its related blade slot, said serrations extending crosswise the blade and blade slot and affording means for readjusting the blade in unit increments in the direction of the longitudinal axis of the blade and blade slot; angularly disposed cutting edges formed on each blade, one of said edges being parallel to the general plane of the cutter, and the other edge parallel to the cutter axis, said adjusting means, in cooperation with the incline of said blade, serving to advance said cutting edges simultaneously in two directions; and means operable from the face of the assembled cutter for releasing the blades from said clamped position in the body comprising a drift pin member adapted to be inserted in an opening provided in said rim intersecting the inclined bottom wall of each blade slot through which a force may be applied to the blade for releasing same, said opening having its axis parallel to the taper on said blades and inclined forwardly and away from the general plane of the cutter as to be accessible for blade removal and adjustment purposes when the assembled cutter is mounted in position on a machine tool spindle.

2. A device operable from the front face of an inserted blade finishing cutter for releasing the blades therefrom without removing the assembled cutter from the spindle of a machine tool, combining the cutter body member having an outwardly flared external rim portion and a plurality of blade slots formed in the periphery thereof extending inwardly to a depth not more than half the distance of the width of the rim, said slots being inclined rearwardly and inwardly from the front face and outer marginal portions of the rim and being tapered in a direction substantially perpendicular to the direction of their rearward incline; blade members complementally tapered crosswise their length inserted in said slots and adapted to be clamped therein by a wedging action; a series of parallel serrations on one surface of each blade and the engaging surface of its related blade slot, said serrations extending in a direction coincident with the taper and affording means for indicating blade positions in unit increments in a direction paralleling the longitudinal axis of the inclined blade and blade slot; and means for releasing the blades from said clamped position in the body comprising a drift pin member adapted to be inserted in an aperture provided in said rim intersecting the under side of each blade slot by which a force may be imparted to the under side of the blade and centrally thereof for releasing same, said aperture having its axis inclined forwardly and away from the general plane of the cutter and accessible for blade releasing operations when the cutter assembly is mounted on a machine spindle.

ERNEST REANEY.